US010831030B2

(12) United States Patent
Stellmach (10) Patent No.: US 10,831,030 B2
(45) Date of Patent: Nov. 10, 2020

(54) SYSTEMS AND METHODS FOR VISUALLY GUIDED GAZE-BASED TARGETING

(71) Applicant: Microsoft Technology Licensing, LLC, Redmond, WA (US)

(72) Inventor: Sophie Stellmach, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 15/958,632

(22) Filed: Apr. 20, 2018

(65) Prior Publication Data

US 2019/0324270 A1 Oct. 24, 2019

(51) Int. Cl.
*G02B 27/01* (2006.01)
*G06F 3/01* (2006.01)
*G06T 7/70* (2017.01)
*G06T 19/00* (2011.01)

(52) U.S. Cl.
CPC ......... *G02B 27/0172* (2013.01); *G06F 3/013* (2013.01); *G06T 7/70* (2017.01); *G02B 2027/0138* (2013.01); *G06T 19/006* (2013.01)

(58) Field of Classification Search
CPC .. G06F 3/04812; G06F 3/04842; G06F 3/013; G02B 2027/0138; G02B 27/0172; G06T 19/006; G06T 7/70
See application file for complete search history.

(56) References Cited

U.S. PATENT DOCUMENTS

| 8,933,912 | B2 * | 1/2015 | Ambrus | G02B 27/0093 |
| | | | | 178/18.09 |
| 9,841,814 | B1 * | 12/2017 | Kallmeyer | G06T 11/00 |
| 2018/0008141 | A1 * | 1/2018 | Krueger | A61B 5/744 |
| 2018/0275753 | A1 * | 9/2018 | Publicover | G06F 3/013 |
| 2019/0237044 | A1 * | 8/2019 | Day | G06F 3/011 |

FOREIGN PATENT DOCUMENTS

| EP | 3008567 A1 | 4/2016 |
| EP | 3015953 A1 | 5/2016 |

OTHER PUBLICATIONS

"International Search Report and Written Opinion Issued in PCT Application No. PCTUS2019027410", dated Jul. 8, 2019, 11 Pages.

* cited by examiner

*Primary Examiner* — Yon J Couso
(74) *Attorney, Agent, or Firm* — Ray Quinney & Nebeker P.C.; John O. Carpenter (57) ABSTRACT

A method for improving visual interaction with a virtual environment includes measuring a position of a user's gaze relative to a virtual element, presenting a visual cue when the user's gaze overlaps the virtual element, and guiding the user's gaze toward an origin of the virtual element with the visual cue.

20 Claims, 7 Drawing Sheets

SYSTEMS AND METHODS FOR VISUALLY GUIDED GAZE-BASED TARGETING

BACKGROUND

Background and Relevant Art

Virtual reality (VR), augmented reality (AR), and mixed reality (MR) display systems allow a user to experience visual information presented from a computer while experiencing and interacting with a virtual environment in a natural and organic manner.

The virtual environment includes virtual elements that can be selectable or otherwise interacted with by a user. Some display systems including a gaze-tracking device to measure the location of the user's gaze within the virtual environment relative to the virtual elements. The movement of a user's gaze, however, is typically very noisy with saccadic movements, tremors, rapid movement, and involuntary movements, as examples. Reducing false selections or unintended interactions may be reduced by the use of contextual and intuitive visual guidance and cues.

BRIEF SUMMARY

In some embodiments, a method for improving visual interaction with a virtual environment includes measuring a position of a user's gaze relative to a virtual element, presenting a visual cue when the user's gaze overlaps the virtual element, and guiding the user's gaze toward an origin of the virtual element with the visual cue.

In other embodiments, a method for improving visual interaction with a virtual environment includes measuring a position of a user's gaze cloud relative to a virtual element, presenting a visual cue when the user's gaze cloud overlaps the virtual element, and guiding the user's gaze cloud toward an origin of the virtual element with the visual cue.

In yet other embodiments, a system for presenting visual information to a user includes a head-mounted display. The head-mounted display includes a display device, a gaze-tracking device, a processor, and a hardware storage medium. The hardware storage medium having instructions thereon that, when executed by the processor, cause the processor to measure a position of a user's gaze with the gaze-tracking device relative to a virtual element presented by the display device, present a visual cue with the display device when the user's gaze overlaps the virtual element, and guide the user's gaze toward an origin of the virtual element with the visual cue.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3-1 is a virtual environment, according to at least one embodiment of the present disclosure;

FIG. 3-2 is a virtual environment with a gaze location cursor, according to at least one embodiment of the present disclosure;

FIG. 3-3 is a visual cue presented in the virtual environment of FIG. 3-2, according to at least one embodiment of the present disclosure;

FIG. 4-1 is a virtual environment with a gaze location cursor, according to at least one embodiment of the present disclosure;

FIG. 4-2 is the virtual environment of FIG. 4-1 with a gaze cloud, according to at least one embodiment of the present disclosure;

FIG. 4-3 is the virtual environment of FIG. 4-1 with a gaze cloud interacting with a visual cue, according to at least one embodiment of the present disclosure;

FIG. 5-1 is a virtual environment with a gaze location cursor, according to at least one embodiment of the present disclosure;

FIG. 5-2 is a visual cue presented on the gaze location cursor of FIG. 5-1, according to at least one embodiment of the present disclosure;

FIG. 5-3 is the visual cue of FIG. 5-2 moving to an origin of a virtual element, according to at least one embodiment of the present disclosure;

FIG. 6-1 is a virtual environment with a gaze cloud, according to at least one embodiment of the present disclosure;

FIG. 6-2 is a visual cue presented on the gaze cloud of FIG. 6-1, according to at least one embodiment of the present disclosure;

FIG. 6-3 is the visual cue of FIG. 6-2 moving to an origin of a virtual element, according to at least one embodiment of the present disclosure;

FIG. 10-1 is a virtual environment with no virtual elements and a gaze location cursor, according to at least one embodiment of the present disclosure;

FIG. 10-2 is the virtual environment of FIG. 10-1 with a guidance frame, according to at least one embodiment of the present disclosure; and FIG. 10-3 is the guidance frame of FIG. 10-2 panning within the virtual environment, according to at least one embodiment of the present disclosure.

DETAILED DESCRIPTION

This disclosure generally relates to devices, systems, and methods for visual user interaction with visual information. More specifically, the present disclosure relates to improving interaction with virtual elements using gaze-based targeting and selection. In some embodiments, visual information may be provided to a user by a near-eye display. A near-eye display may be any display that is positioned near a user's eye, either to supplement a user's view of their surroundings, such as augmented or mixed reality devices, or to replace the user's view of their surroundings, such as virtual reality devices. In some embodiments, an augmented reality or mixed reality device may be a head-mounted display (HMD) that presents visual information to a user overlaid on the user's view of their surroundings. For example, the visual information from the HMD may be combined with ambient or environment light to overlay visual information, such as text or images, on a user's surroundings.

In some embodiments, the user's field of view may be at least partially encompassed by a waveguide through which the user views their surroundings. The waveguide may direct display light from a display device to the user's field of view. The waveguide may guide the display light before out-coupling the light. Upon out-coupling the light, the waveguide may combine the visual information of the display light with ambient light from the user's surroundings to deliver the visual information to the user. Overlaying the visual information from the HMD on the user's surroundings may require precise generation and positioning of the visual information relative to the user's eyes.

Visual information including virtual elements may be positioned in the user's field of view on the waveguide or other near-eye display. A gaze-tracking device of the HMD may image at least a portion of the user's eye (such as the pupil, the iris, the sclera) and identify a direction or location of the user's gaze. The direction or location of the user's gaze may then be extrapolated to a position on the near-eye display. A selection cursor may be associated with the gaze location to allow the user to highlight or select a virtual element by looking at the virtual element.

In some embodiments, the gaze location may move relative to the virtual element. For example, systematic uncertainty in the measurement of the gaze location by the gaze-tracking device may introduce uncertainty to the gaze location in successive measurement. In other examples, saccadic movement of the eye may produce abrupt movements leading to uncertainty in the gaze location. In yet other examples, ocular tremors may introduce movement and/or uncertainty to the gaze location. In further examples, even momentary voluntary movements such as brief distractions from a moving or high contrast element may cause rapid saccades that introduce uncertainty in the measurement of the gaze position.

Virtual element selection based on the gaze location may be unreliable due to uncertainty or movement in the gaze location. Gaze locations at or near a boundary of a virtual element, for example, may lead to unintended selection of a virtual element, failure to properly select the intended virtual element, or selection of an incorrect virtual element. Gaze-based virtual element selection may be improved by ascertaining the gaze location more reliably, by guiding the user's gaze away from edges of virtual elements or other high uncertainty locations, or by other techniques and systems described herein.

Figure 1:
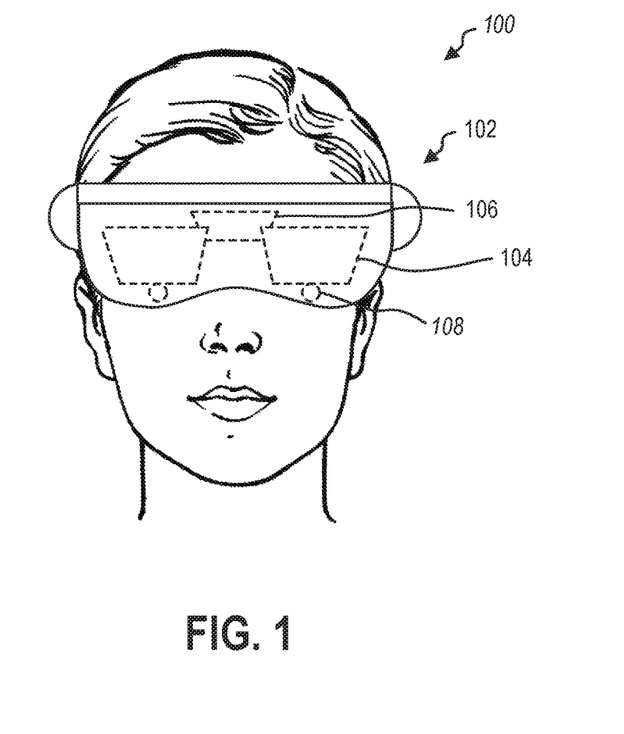
FIG. 1 is a perspective view of a head-mounted display (HMD) including a waveguide, according to at least one embodiment of the present disclosure.

FIG. 1 is a perspective view of a user 100 wearing a HMD 102. In some embodiments, the HMD 102 may have a waveguide 104 positioned near the user 100 to direct visual information to the user 100. The HMD 102 may include a single waveguide 104, a separate waveguide 104 for each of the user's eyes (i.e., two waveguides 104), or more than two waveguides 104 to provide visual information over a larger field of view.

In some embodiments, the HMD 102 may include one or more processors, storage devices, power supplies, audio devices, display devices, cameras, communication devices, or combinations thereof, that receive, collect, store, process, or calculate information that is provided to the user. For example, a display device 106 may be positioned optically adjacent the waveguide(s) to provide visual information to the waveguide(s) 104, which may, in turn, be presented in the user's field of view by the waveguide(s) 104.

In some embodiments, the HMD 102 may further include a gaze-tracking device 108 positioned in the HMD 102 to track a direction of the user's gaze. The gaze-tracking device 108 may include a camera or a plurality of cameras to image the user's eyes. In other words, the gaze-tracking device 108 may image the user's pupil, iris, sclera, other portions of the user's eye, or combinations thereof to calculate the direction the user is looking. In some embodiments, the gaze-tracking device 108 may measure and/or calculate the x- and y-components of the user's gaze.

Figure 2:
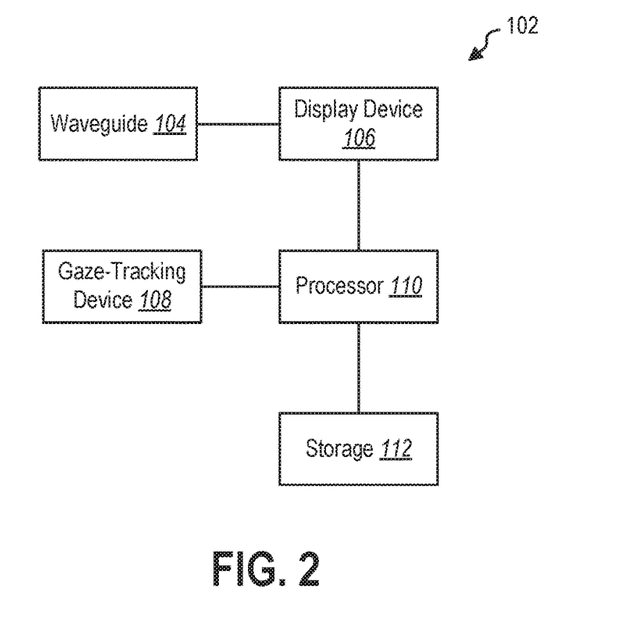
FIG. 2 is a schematic representation of the HMD of FIG. 1, according to at least one embodiment of the present disclosure.

FIG. 2 is a schematic representation of the HMD 102 including the waveguide in optical communication with the display device 106. The display device 106 and gaze-tracking device 108 may be in data communication with a processor 110. The processor 110 may further be in data communication with a storage device 112. The storage device 112 may be a hardware storage device, such as a platen-based storage device, a solid-state storage device, or other non-transitory or long-term storage device. The storage device 112 may have instructions stored thereon to execute one or more methods of portions of methods described in the present disclosure.

Figure 31:
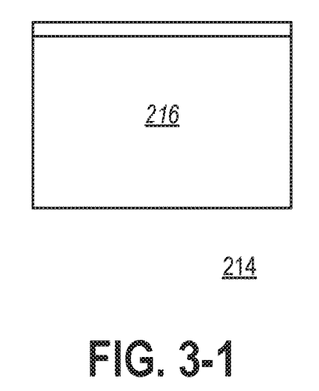

FIG. 3-1 is a schematic representation of a virtual environment 214 containing a virtual element 216 that may be presented to a user on a display, such as a waveguide of the HMD 102 of FIG. 1, a display of a MR system, a display of a VR system, a display of an AR system, or other near-eye display in communication with a processor and/or a gaze-tracking device. In other embodiments, the virtual environment 214 may be presented on another display, such as a laptop, tablet, desktop, large format, or other display in communication with a processor and/or a gaze-tracking device. In some embodiments, the virtual element 216 may be any element of the virtual environment that is selectable in the available software. For example, the virtual element 216 may be a window of an application presented in the virtual environment. In other examples, the virtual element 216 may be a button, menu, scroll bar, or another interactive element of a user interface. In yet other examples, the virtual element 216 may be a virtual representation of an element of the physical environment around a user.

Figure 32:
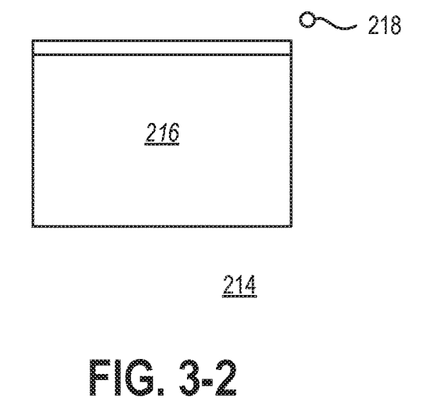

FIG. 3-2 illustrates the virtual environment 214 and virtual element 216 of FIG. 3-1 with a gaze position cursor 218 positioned near but not touching the virtual element 216. Due to the uncertainty and/or the movement of the actual gaze position of the user's eye, there may be uncertainty as to the measured gaze position at which the gaze position cursor 218 is positioned. Therefore, it may be unclear whether the user is intending to select the virtual element 216 with the gaze position cursor 218 or not. More specifically, the border of a virtual element 216 may be a particularly high contract portion the virtual environment 214. High contrast visual features may involuntarily attract a user's attention or gaze. In practice, this phenomenon causes the gaze position cursor 218 to be positioned in "lower certainty areas", such as the edge of selectable elements, than "higher certainty areas", such as the center of selectable elements.

In some embodiments, a method of improving interaction with virtual elements using gaze-based selection may include presenting a visual presenting a visual cue when the user's gaze overlaps the virtual element and guiding the user's gaze toward an origin of the virtual element with the visual cue. For example, the origin may be the geometric center (center of the height and center of the width) of the virtual element. In other examples, the origin may be the volumetric center of the virtual element. In a specific example, the origin of a virtual model of the Eiffel Tower may be positioned closer to the bottom with a volumetric origin than a geometric origin. In yet other examples, the origin may be a "higher certainty area", such as a visible area, a high contrast area, or other area of the virtual element as selected by the user or by the system.

Providing a visual cue may intuitively indicate to a user to look at or near the origin of the virtual element to select the virtual element, at which the user may subsequently and consciously look. For example, the appearance of a bullseye design at the origin of a button may provide a user with an intuitive instruction to look at the bullseye to positively select the virtual element. Additionally, the visual cue may leverage the same involuntary response described earlier to unconsciously guide the user's gaze toward the origin of the virtual element by presenting a high contrast visual element at the origin. For example, the sudden appearance of a bullseye design at the origin of a button may provoke an involuntarily response from the user to look at the bullseye.

Figure 33:
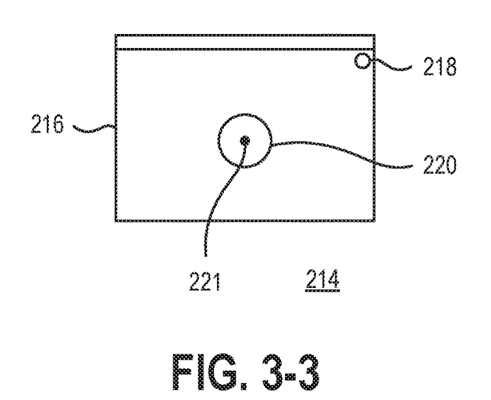

FIG. 3-3 illustrates an example of presenting a visual cue to a user. FIG. 3-3 illustrates the virtual element 218 and the virtual environment 214 of FIG. 3-2 with the gaze position cursor 218 now positioned touching the virtual element 216. A visual cue 220 may be presented to the user by the display at the origin 221 of the virtual element 216.

In some embodiments, the visual cue 220 may be a static cue (e.g., non-moving relative to the virtual element 216) that appears at the origin 221 when the user's gaze and/or gaze position cursor 218 is located on the virtual element 216. The visual cue 220 may appear immediately upon detection of the user's gaze on the virtual element 216, or the visual cue 220 may appear after a dwell time. For example, the visual cue 220 may appear after an at least 100 milliseconds dwell time after the detection of the user's gaze on the virtual element 216 and if the user's gaze remains on the virtual element 216 for the dwell time. In other examples, the visual cue 220 may appear after an at least 250 millisecond dwell time of the user's gaze on the virtual element 216. In yet other examples, the visual cue 220 may appear after an at least 500 millisecond dwell time of the user's gaze on the virtual element 216. In further examples, the visual cue 220 may appear after an at least 1.0 second dwell time of the user's gaze on the virtual element 216. For example, a dwell time may allow a user to quickly glance at multiple virtual objects or to saccade away to and back from an element of interest (and/or cross other virtual elements) without a plurality of visual cues 220 rapidly appearing and disappearing throughout the virtual environment 214. The dwell time may further allow a user to visually interact with the virtual environment 214 and/or virtual element 216 without the use of visual cues 220 until a user dwells on a particular virtual element 216 for the dwell time.

In some embodiments, the visual cue 220 may appear instantaneously at the origin 221 of the virtual element 216. In other embodiments, the visual cue 220 may appear with one or more animations. For example, the visual cue 220 may fade in or out, to provide a less distracting overall environment with which the user may interact. In other examples, the visual cue 220 may appear with a wipe, an expansion, or other animation that allows the visual cue 220 to remain in a static location. Similarly, the visual cue 220 may disappear with a wipe, an expansion, or other animation that allows the visual cue 220 to remain in a static location.

Figure 41:
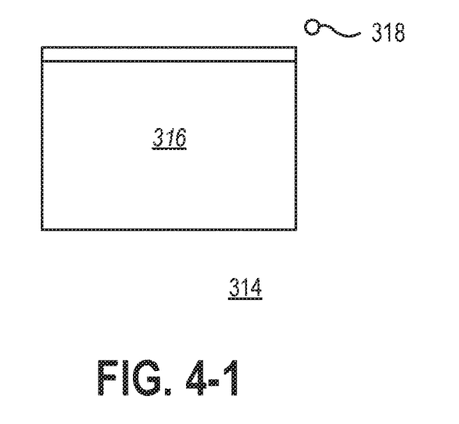
Figure 42:
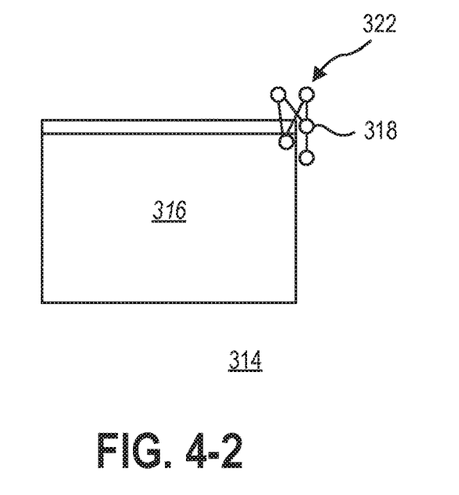
Figure 43:
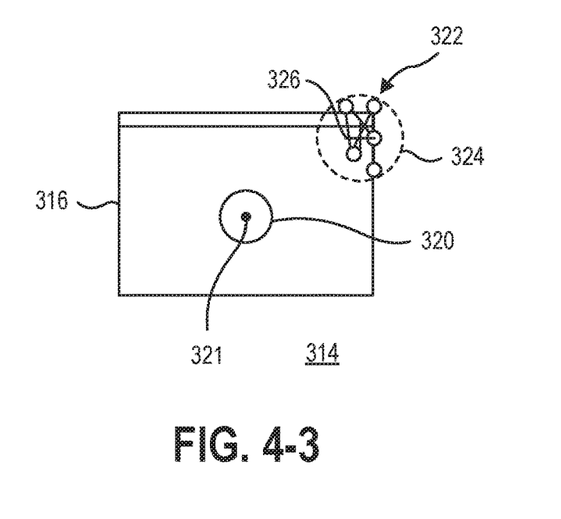

FIG. 4-1 through FIG. 4-3 illustrate another embodiment of a method of improving interaction with virtual elements using gaze-based selection. FIG. 4-1 illustrates a virtual environment 314 including a virtual element 316 and a gaze position cursor 318. As described herein, there may be uncertainty in the precise placement of the gaze position cursor 318. In at least one example, the gaze position cursor 318 of FIG. 4-1 may be the detected position of a user's gaze in which the user is attempting to select the upper right corner of the virtual element 316. Due to the uncertainty in the precise placement of the gaze position cursor 318, the user may be unable to reliably select the virtual element 316.

FIG. 4-2 illustrates an embodiment of a gaze cloud 322 that may include a plurality of detected gaze positions. The gaze cloud 322 is illustrated at a plurality of gaze position cursors 318 with each gaze position cursor 318 representing a detected gaze position for the purposes of description and illustration, but the gaze cloud 322 may appear as a single cursor or as a dynamic cursor with a shape that changes as the plurality of detected gaze positions changes.

For example, the gaze cloud 322 may include a quantity of detected gaze positions that are collected in sequence by the gaze-tracking device. In some embodiments, the sequence of detected gaze positions may be collected with a frequency in a range having an upper value, a lower value, or upper and lower values including any of 10 Hertz (Hz), 50 Hz, 100 Hz, 250 Hz, 500 Hz, 1000 Hz, 5000 Hz, 10000 Hz, or any values therebetween. For example, the gaze-tracking device may detect the gaze location with a frequency of at least 10 Hz. In other examples, the gaze-tracking device may detect the gaze location with a frequency of less than 10000 Hz. In yet other examples, the gaze-tracking device may detect the gaze location with a frequency between 10 Hz and 10000 Hz. In further examples, the gaze-tracking device may detect the gaze location with a frequency between 50 Hz and 1000 Hz. In at least one example, the gaze-tracking device may detect the gaze location with a frequency of about 100 Hz. Higher frequencies may allow for more statistically significant calculations and estimates, as well as allowing for the removal of false measurements or failed measurements. Lower frequencies may be more energy efficient, requiring less power consumption both by the gaze-tracking device as well as the processor receiving the detected gaze locations and calculating the gaze cloud 322.

In some embodiments, the gaze cloud 322 may be calculated by including a plurality of detected gaze locations. For example, the gaze cloud 322 may include a quantity of detected gaze locations in a range having an upper value, a lower value, or upper and lower values including any of 2, 3, 4, 5, 6, 8, 10, 12, 15, 20, 30, 40, 50, 100, or any values therebetween. For example, the gaze cloud 322 may include at least 2 detected gaze positions. In other examples, the gaze cloud 322 may include less than 100 detected gaze positions. In yet other examples, the gaze cloud 322 may include between 2 and 100 detected gaze positions. In further examples, the gaze cloud 322 may include between 3 and 50 detected gaze positions. In yet other examples, the gaze cloud 322 may include between 4 and 20 detected gaze positions. In at least one example, the gaze cloud 322 may be calculated using about 10 detected gaze positions.

Higher quantities may allow for more statistically significant calculations and estimates, as well as allowing for the removal of false measurements or failed measurements. Lower quantities may be more energy efficient, requiring less power consumption both by the gaze-tracking device as well as the processor receiving the detected gaze locations and calculating the gaze cloud 322. Additionally, lower quantities may allow for more frequent refreshes to the gaze cloud 322 location, depending on the frequency with which detected gaze locations are collected and provided to the processor.

In some embodiments, the gaze cloud 322 may be calculated by a rolling calculation based on the previous set of detected gaze locations, updated as each new gaze location is provided. For example, each millisecond, a gaze location may be detected by the gaze-tracking device. The gaze cloud 322 may be updated each millisecond (ms) using the previous ten gaze locations (i.e., including the previous ten ms of locations). In such an example, each subsequent gaze cloud 322 may include nine of the gaze locations of the previous gaze cloud 322. In other embodiments, the gaze cloud 322 may be updated each 10 ms using ten gaze locations collected every millisecond for the previous 10 ms. In such an example, each subsequent gaze cloud 322 may include no gaze location data with the previous gaze cloud 322.

The gaze cloud 322 may include detected gaze locations from a gaze duration. In some embodiments, the gaze duration may be in a range having an upper value, a lower value, or upper and lower values including any of 1 ms, 2 ms, 3 ms, 5 ms, 10 ms, 20 ms, 50 ms, 100 ms, 250 ms, 500 ms, 1.0 s, or any values therebetween. For example, the gaze duration may be at least 1 ms. In other examples, the gaze duration may be less than 1.0 s. In yet other examples, the gaze duration may be between 1 ms and 1.0 s. In further examples, the gaze duration may be between 5 ms and 50 ms. In at least one example, the gaze duration may be less than 10 ms.

In some embodiments, the gaze cloud 322 may include only detected gaze locations within a threshold angle relative to other detected gaze locations of the gaze cloud 322. For example, a gaze cloud 322 may include ten detected gaze locations, where one of the gaze locations may be outside the threshold angle relative to the remaining nine, and the one may be excluded from the calculation of the gaze cloud 322. In some embodiments, the threshold angle may be 0.5° of displacement in the detected gaze location relative to the user's eye. In other embodiments, the threshold angle may be 1° of displacement in the detected gaze location relative to the user's eye. In yet other embodiments, the threshold angle may be 2° of displacement in the detected gaze location relative to the user's eye.

The gaze cloud 322 may include a plurality of gaze position cursors 318 positioned both on and off of the virtual element 316 within the virtual environment 314. In such an example, the gaze position cursors 318 individually may not accurately select the virtual element 316 as the user intends.

FIG. 4-3 illustrates the virtual environment 314 and virtual element 316 of FIG. 4-2 with gaze cloud 322 positioned on the virtual element 316 and a visual cue 320 presented on the virtual element 316 in response to the gaze cloud 322. The visual cue 320 may be any visual cue described herein. The visual cue 320 may assist in guiding the user's gaze (or gaze cloud 322) to the origin of the virtual element 316. In some embodiments, the gaze cloud 322 may be "on" the virtual element 316 when at least a portion of the gaze cloud border 324 overlaps a portion of the virtual element 316. In other embodiments, the gaze cloud 322 may be "on" the virtual element 316 when at least 50% of the gaze cloud 322 overlaps a portion of the virtual element 316. In yet other embodiments, the gaze cloud 322 may be "on" the virtual element 316 when a centerpoint 326 of the gaze cloud 322 overlaps a portion of the virtual element 316.

In some embodiments, the gaze cloud border 324 may be substantially circular. For example, the gaze cloud 322 may be calculated by averaging the location of the detected gaze locations and applying a radius to encompass all of the detected gaze locations. In other embodiments, the gaze cloud border 324 may be elliptical. For example, the gaze cloud 322 may be calculated by averaging the location of the detected gaze locations and applying an ellipse to encompass all of the detected gaze locations. In yet other embodiments, the gaze cloud border 324 may be irregularly shaped. For example, the gaze cloud 322 may be calculated by bounding all of the detected gaze locations with an irregular shape.

Figure 51:
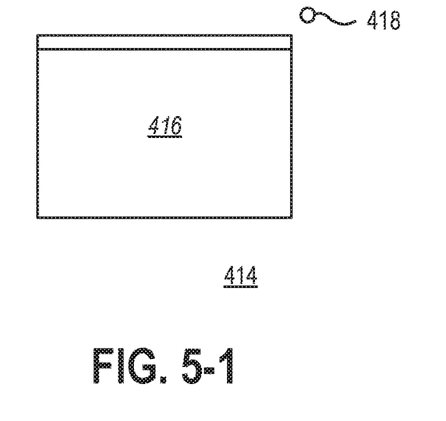
Figure 52:
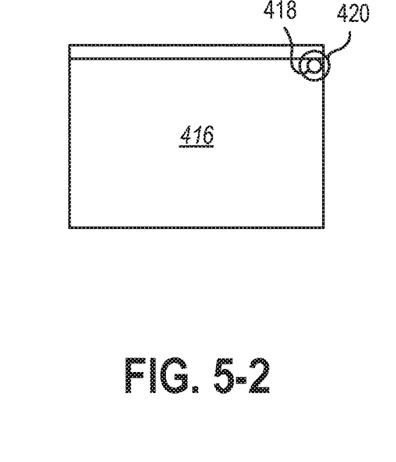

In some embodiments, the visual cue may be a dynamic visual cue that provides contextual information to a user to guide the user's gaze to the origin. FIG. 5-1 illustrates a virtual environment 414 with a virtual element 416 and a gaze location cursor 418. As the gaze location cursor approaches and overlaps a portion of the virtual element 416, a visual cue 420 may be presented at the location of the gaze location cursor 418, as shown in FIG. 5-2. As described herein, the visual cue 420 may appear immediately or the visual cue 420 may appear after a dwell time. Additionally, the visual cue 420 may instantaneously or may appear with an animation.

Figure 53:
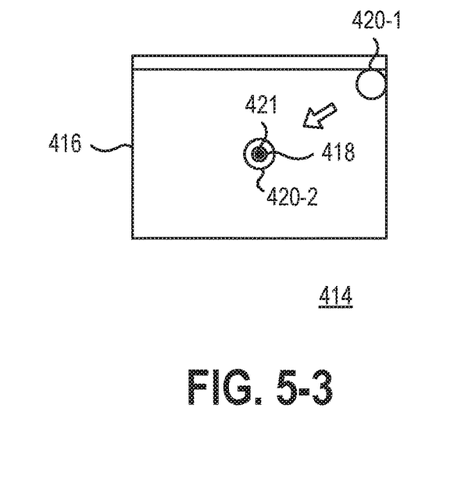

As shown in FIG. 5-3, in some embodiments, the visual cue may move from the initial visual cue 420-1 to an origin visual cue 420-2 at an origin 421 of the virtual element 416. For example, the visual cue may move from the initial visual cue 420-1 to an origin visual cue 420-2 by continuously moving (e.g., translating) through the virtual environment 414. In other examples, the visual cue may move from the initial visual cue 420-1 to the origin visual cue 420-2 by instantaneous movement. In some embodiments, the movement of the visual cue from the initial visual cue 420-1 to the origin visual cue 420-2 may be repeated to further communicate the location of the origin 421 to the user. For example, the movement of the initial visual cue 420-1 to the origin visual cue 420-2 may repeat 2, 3, 4, 5, or more times. In at least one embodiment, the movement of the initial visual cue 420-1 to the origin visual cue 420-2 may be continuous as long as the gaze location cursor 418 is positioned on the virtual element 416. For example, the position of the initial visual cue 420-1 may update with that of the gaze location cursor 418 while the gaze location cursor 418 is positioned on the virtual element 416.

A dynamic visual cue may provide greater communication to a user when the origin 418 is farther from the gaze location cursor 418 than when a static visual cue is used. In some embodiments, a dynamic visual cue may be used when the origin is more than 5° away from the user's gaze. For example, a user's peripheral vision may encompass within 5° of the detected gaze location. The user may not perceive a visual cue present outside of the peripheral vision. In such situations, a dynamic visual cue may lead the user's gaze to the origin, despite the origin being outside of the user's peripheral vision.

Figure 61:
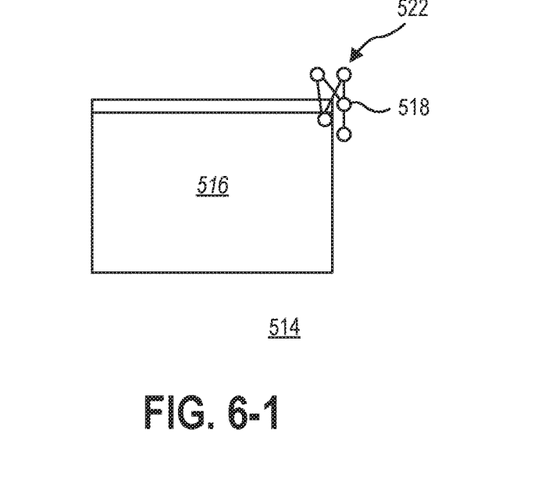
Figure 62:
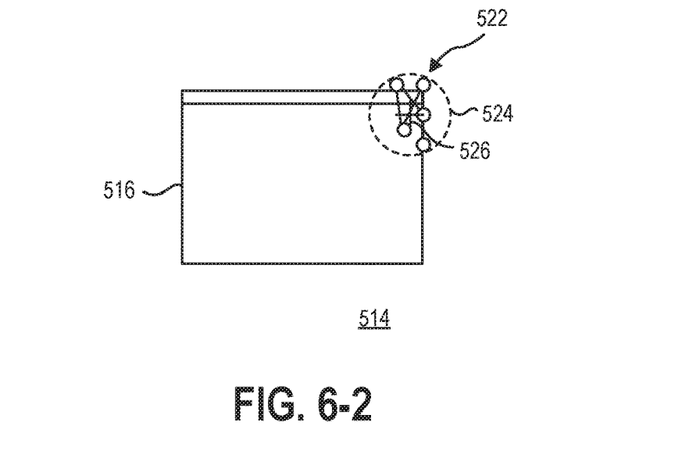

In some embodiments, a dynamic visual cue may be employed with a gaze cloud. FIG. 6-1 illustrates a virtual environment 514 including a virtual element 516 and a gaze cloud 522. The gaze cloud 522 includes a plurality of gaze locations (represented by gaze location cursors 518). In some embodiments, the gaze cloud 522 may overlap the virtual element 516, as shown in FIG. 6-2. In some embodiments, the gaze cloud 522 may be "on" the virtual element 516 when at least a portion of the gaze cloud border 524 overlaps a portion of the virtual element 516. In other embodiments, the gaze cloud 522 may be "on" the virtual element 516 when at least 50% of the gaze cloud 522 overlaps a portion of the virtual element 516. In yet other embodiments, the gaze cloud 522 may be "on" the virtual element 516 when a centerpoint 526 of the gaze cloud 522 overlaps a portion of the virtual element 516.

Figure 63:
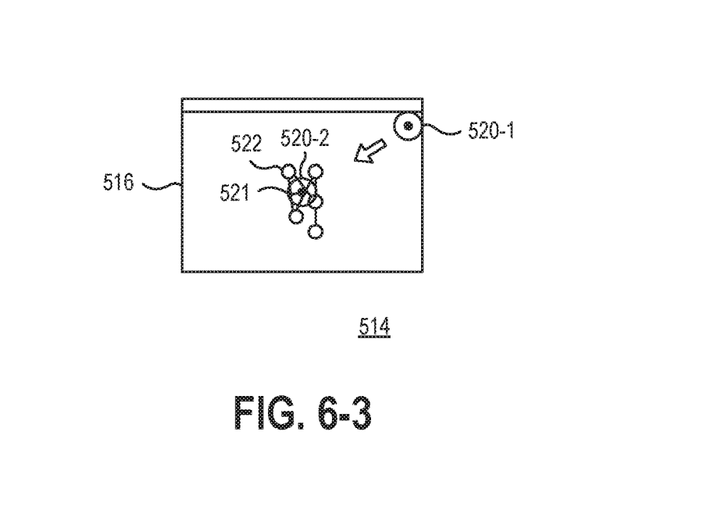

Referring now to FIG. 6-3, in some embodiments, a dynamic visual cue may move from an initial visual cue 520-1 to an origin visual cue 420-2 at an origin 521 of the virtual element 516. For example, the visual cue may move from the initial visual cue 520-1 to an origin visual cue 520-2 by continuously moving (e.g., translating) through the virtual environment 514. In other examples, the visual cue may move from the initial visual cue 520-1 to the origin visual cue 520-2 by instantaneous movement. In some embodiments, the movement of the visual cue from the initial visual cue 520-1 to the origin visual cue 520-2 may be repeated to further communicate the location of the origin 521 to the user.

Figure 7:
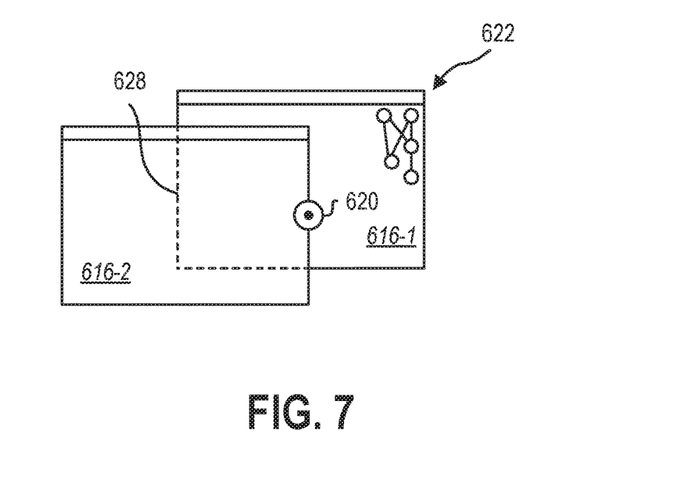
FIG. 7 is a virtual environment having a visual cue on an obscured virtual element, according to at least one embodiment of the present disclosure.

In some embodiments, a static visual cue or a dynamic visual cue may guide the user's gaze to an origin positioned at the center of a virtual element, as shown in FIG. 3-1 through FIG. 6-3. In other embodiments, the center of a first virtual element may be obscured by a second virtual element, as shown in FIG. 7. In some embodiments, a gaze cloud 622 positioned on a first virtual element 616-1 may trigger the presentation of a visual cue 620 at an origin 621 calculated based upon the border 628 of the first virtual element 616-1. The origin 621, however, may be obscured by a second virtual element 616-2. In such embodiments, the visual cue 620 may be presented at the origin 621 in the center of the border 628 of the first virtual element 616-1 while the border 628 is presented to the user. The first virtual element 616-1 may then become selectable anywhere within the border 628 as thought the first virtual element 616-1 were positioned in front of the second virtual element 616-2.

Figure 8:
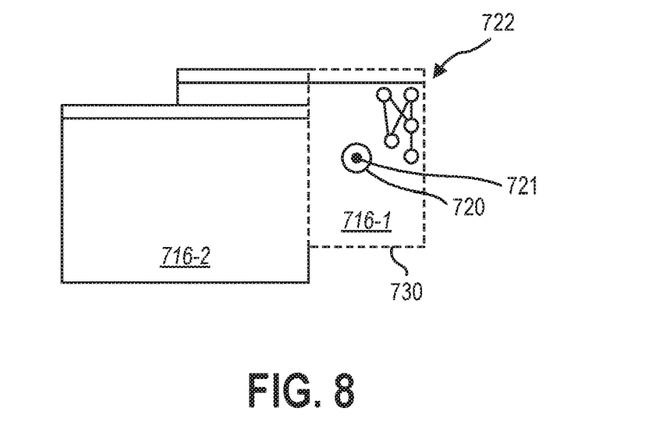
FIG. 8 is a virtual environment having a visual cue on a visible portion of an obscured virtual element, according to at least one embodiment of the present disclosure.

In other embodiments, the origin may be positioned within a virtual element in an unobscured position. FIG. 8 illustrates an embodiment of a first virtual element 716-1 that is partially obscured by a second virtual element 716-2. In such embodiments, the origin 721 may be positioned in an unobscured and/or visible portion of the first virtual element 716-1.

The position of the origin 721 may be calculated or selected based on the portion of the first virtual element 716-1 that is unobscured by the second virtual element 716-2 or other elements in the environment. In some embodiments, an area of the unobscured portion of the first virtual element 716-1 may be considered to representative of the first virtual element 716-1 for the purposes of selection and/or interaction by a use. For example, selection of the first virtual element 716-1 may be limited to selection of an unobscured element 730. In some embodiments, the unobscured element 730 is the largest area that may be encompassed by a rectangular element positioned within the visible portion of the first virtual element 716-1. In other embodiments, the unobscured element 730 is the largest area that may be encompassed by an elliptical element positioned within the visible portion of the first virtual element 716-1. In yet other embodiments, the unobscured element 730 is the largest area that may be encompassed by any regularly shaped polygonal element positioned within the visible portion of the first virtual element 716-1.

In at least one embodiment, the shape of the unobscured element 730 may be related to the shape of the first virtual element 716-1. For example, the first virtual element 716-1 depicted in FIG. 8 is a rectangular virtual element, and the unobscured element 730 may be a rectangular element to complement the shape of the first virtual element 716-1. In other examples, the first virtual element 716-1 may be a circular virtual element, and the unobscured element 730 may be an elliptical element to complement the shape of the first virtual element 716-1.

The origin 721 may, thereby, be calculated based on the largest continuous area of the visible portion of the first virtual element 716-1. The visual cue 720 may be positioned at the origin 721 to lead the user's gaze toward the largest continuous area of the visible portion of the first virtual element 716-1, therefore, to select the first virtual element 716-1 in the most reliable manner.

Figure 9:
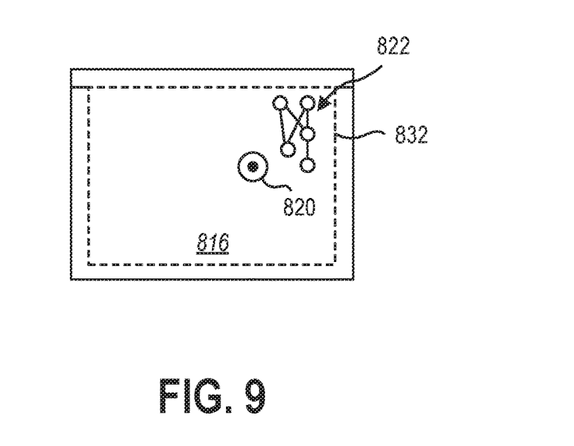
FIG. 9 is a virtual element with an active border, according to at least one embodiment of the present disclosure.

In some embodiments, the reliability of a visual selection of a virtual element may be further increased by presenting a visual cue when a gaze position cursor or a gaze cloud is farther inside the virtual element than merely overlapping the border of the virtual element. FIG. 9 illustrates an example of a virtual element 816 having an active boundary 832 positioned inside the area of the virtual element 816. In other words, the active boundary 832 may be offset from and within the edges of the virtual element 816. In yet other words, the active boundary 832 may define an area smaller than the area of the virtual element 816.

In such an embodiment, a visual cue 820 may be presented when the gaze position cursor or gaze cloud 822 overlaps or is within the active boundary 832. In some embodiments, the gaze position cursor or gaze cloud 822 may be "on" the virtual element 816 when at least a portion of the gaze position cursor or gaze cloud 822 is on or within a portion of the active boundary 832. In other embodiments, the gaze position cursor or gaze cloud 822 may be "on" the virtual element 816 when at least 50% of the gaze position cursor or gaze cloud 822 is on or within a portion of the active boundary 832. In yet other embodiments, the gaze position cursor or gaze cloud 822 may be "on" the virtual element 816 when the entire gaze position cursor or gaze cloud 822 is on or within a portion of the active boundary 832.

Figure 101:
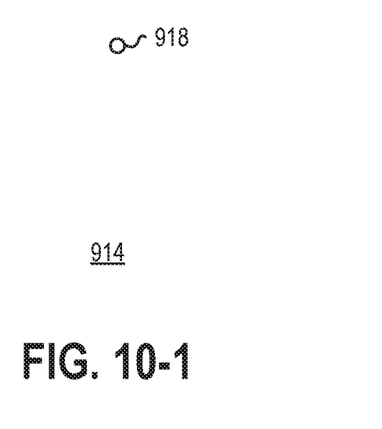

In some embodiments, a visual cue may be presented to a user to assist the user in focusing on a virtual element for selection of the virtual element. In other embodiments, a visual cue may be present to a user to assist the user in focusing on a region of the virtual environment with no virtual elements for placement of an object or element in the empty space. For example, precise placement of a virtual object in empty space of a virtual environment may be difficult when a user has no features on which to focus their gaze. FIG. 10-1 illustrates such a virtual environment 914. The precise positioning of the gaze position cursor 918 may be difficult for a user in empty space.

Figure 102:
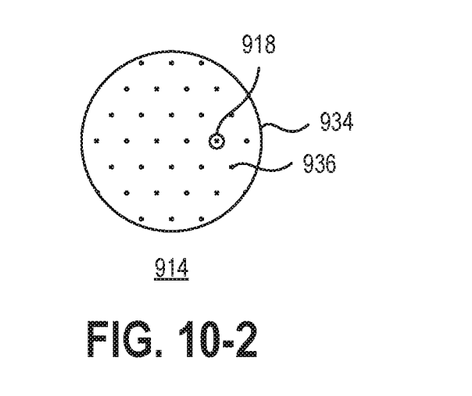

In some embodiments, a guidance frame or other visual cue with one or more visual features may assist a user in precisely placing the gaze position cursor or other element. FIG. 10-2 illustrates an embodiment of a guidance frame 934 located in empty space of the virtual environment 914. The guidance frame 934 may include one or more visual features 936 that may provide a feature on which a use may focus to position the gaze position cursor 918. In some embodiments, the guidance frame 934 may be circular, as shown in FIG. 10-2. In other embodiments, the guidance frame 934 may be square, rectangular, hexagonal, octagonal, other polygonal, elliptical, irregularly shaped, or combinations thereof.

The guidance frame 934 may include one or more visual features 936. In some embodiments, the guidance frame 934 may include a grid of visual features 936. For example, the grid may be a square grid, a hexagonal grid, a triangular grid or other two-dimensional repeating grid pattern. In other examples, the one or more visual features 936 may be oriented in one or more lines, such as a cross of visual features 936. The cross may be, for example, oriented in the x-direction and y-direction as axes which the user may utilize to precisely place their gaze location cursor 918.

In some embodiments, guidance frame 934 and one or more visual features 936 may assist the user in precisely placing their gaze location cursor 918 by providing a stationary point upon which the user may concentration. In other embodiments, the gaze location cursor 918 may snap to the one or more visual features 936. For example, the gaze location cursor 918 may be positioned on a visual feature 936 that is nearest to a detected gaze location. Relatively small variations in the detected gaze location, therefore, may not alter the position of the gaze location cursor 918 in the virtual environment 914.

Figure 103:
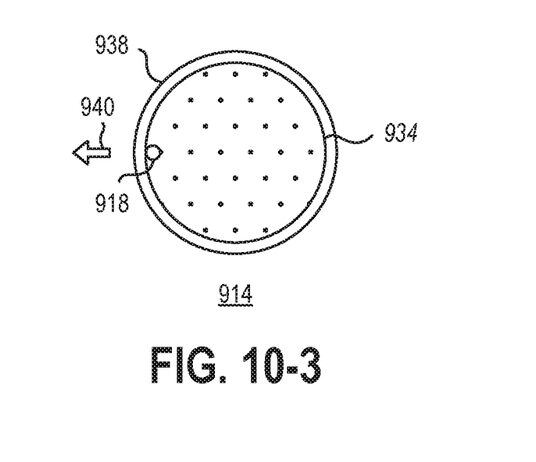

FIG. 10-3 illustrates movement of the guidance frame 934 using the gaze location cursor. In some embodiments, the guidance frame 934 may be moveable by the gaze location cursor 918. For example, the guidance frame 934 may have a panning perimeter 938. Positioning the gaze location cursor 918 on or adjacent the panning perimeter 938 may pan the guidance frame 934 in a translation direction 940 based on the area of the panning perimeter 938 selected by the gaze location cursor 918. In some embodiments, the guidance frame 934 and one or more visual features 936 may pan together. In other embodiments, the guidance frame 934 may pan while the one or more visual features 936 (e.g., the grid pattern) may remain stationary in the virtual environment 914 while the guidance frame 934 translates relative to the one or more visual features 936. In other words, the guidance frame 934 may move relative to the one or more visual features 936 as though the guidance frame 934 is a window to a grid pattern that extends in the virtual environment 914. The guidance frame 934 may "expose" a different portion of the visual features 936 or grid pattern as the guidance frame 934 moves relative to the grid pattern.

In at least one embodiment, a system or method according to the present disclosure may provide a static or dynamic visual cue to aid a user in visual interaction with a virtual environment. Due to the biological and systematic limitations of visual cursor placement, a visual cue may provide a user context to interact with the virtual environment and feedback as to the display system's interpretation of the user's inputs. More reliable positioning of the user's gaze and more intuitive feedback may improve the user experience of interacting with a virtual environment using gaze-based selections.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for improving visual interaction with a virtual environment, the method comprising:
    measuring a position of a user's gaze relative to a virtual element;
    presenting a visual cue overlapping the virtual element in response to the measured position of the user's gaze overlapping the virtual element; and
    guiding the user's gaze toward an origin of the virtual element with the visual cue.

2. The method of claim 1, measuring a position of the user's gaze using a head-mounted display.

3. The method of claim 1, the visual cue being a static visual cue.

4. The method of claim 1, the visual cue being a dynamic visual cue that moves in a path between the user's gaze and the origin of the virtual element.

5. The method of claim 1, the origin being at the volumetric center of the virtual element.

6. The method of claim 1, the origin being in a visible portion of the virtual element when a second virtual element obscures part of the virtual element.

7. A method for improving visual interaction with a virtual environment, the method comprising:
   measuring a position of a user's gaze cloud relative to a virtual element;
   presenting a visual cue overlapping the virtual element in response to at least a portion of the gaze cloud overlapping the virtual element; and
   guiding the user's gaze cloud toward an origin of the virtual element with the visual cue.

8. The method of claim 7, measuring a position of the user's gaze cloud including measuring a user's gaze in a head-mounted display.

9. The method of claim 7, the gaze cloud including an average of a plurality of measured gaze positions.

10. The method of claim 9, the plurality of measured gaze positions being measured over a duration of less than 10 milliseconds.

11. The method of claim 7, the visual cue being a dynamic visual cue that moves in a path between a center of the user's gaze cloud and the origin of the virtual element.

12. The method of claim 7, presenting a visual cue including presenting the visual cue when at least 50% of the gaze cloud overlaps the virtual element.

13. The method of claim 7, the origin being at the geometric center of the virtual element.

14. The method of claim 7, the origin being in a visible portion of the virtual element when a second virtual element obscures part of the virtual element.

15. The method of claim 14, presenting a visual cue further comprising presenting a border of the virtual element overlaid on the second virtual element.

16. The method of claim 14, further comprising prioritizing the display order of the virtual element in front of the second virtual element.

17. A system for presenting visual information to a user, the system comprising:
   a head-mounted display, the head-mounted display including:
      a display device,
      a gaze-tracking device,
      a processor in data communication with the display device and gaze-tracking device, and
      a hardware storage medium in data communication with the processor, the hardware storage medium having instructions thereon that, when executed by the processor, cause the processor to:
         measure a position of a user's gaze with the gaze-tracking device relative to a virtual element presented by the display device;
         present a visual cue overlapping the virtual element with the display device in response to the measured position of the user's gaze overlapping the virtual element; and
         guide the user's gaze toward an origin of the virtual element with the visual cue.

18. The system of claim 17, wherein the user's gaze is a gaze cloud.

19. The system of claim 17, further comprising a waveguide in communication with the display device, where the visual cue is presented on the waveguide.

20. The system of claim 17, the gaze-tracking device including a plurality of cameras to track a user's eyes.

* * * * *